United States Patent
Shimomura (10) Patent No.: US 9,535,719 B2
(45) Date of Patent: Jan. 3, 2017

(54) INFORMATION PROCESSING SYSTEM AND COMPUTER CONTROL METHOD FOR CALCULATING AND ALLOCATING COMPUTER RESOURCES

(75) Inventor: Tomonori Shimomura, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 2084 days.

(21) Appl. No.: 12/299,173

(22) PCT Filed: Feb. 21, 2007

(86) PCT No.: PCT/JP2007/053215
§ 371 (c)(1),
(2), (4) Date: Jan. 9, 2009

(87) PCT Pub. No.: WO2007/129498
PCT Pub. Date: Nov. 15, 2007

(65) Prior Publication Data
US 2009/0217285 A1      Aug. 27, 2009

(30) Foreign Application Priority Data
May 2, 2006   (JP) .................................. 2006-128745

(51) Int. Cl.
*G06F 9/50*     (2006.01)
*G06F 9/44*     (2006.01)
(52) U.S. Cl.
CPC .......... *G06F 9/4443* (2013.01); *G06F 9/5022* (2013.01)
(58) Field of Classification Search
CPC .................................. G06F 9/50; G06F 9/5022
See application file for complete search history.

(56) References Cited

U.S. PATENT DOCUMENTS 5,671,225 A  *  9/1997  Hooper ................... H04L 29/06
                                                       370/468
6,580,431 B1 *  6/2003  Deosaran ............. G06F 9/5044
                                                       345/503
(Continued)

FOREIGN PATENT DOCUMENTS

JP          04369717        12/1992
JP          08137655         5/1996
(Continued)

OTHER PUBLICATIONS

International Search Report dated Mar. 20, 2007 from corresponding PCT/JP07/053215.

(Continued)

*Primary Examiner* — Jacob A Petranek
(74) *Attorney, Agent, or Firm* — Katten Muchin Rosenman LLP (57) ABSTRACT

A first program obtains calculation resource information for determining computer calculation resource to be used by one of a plurality of second programs, one to be begun being executed by the computer, and releases, based on the calculation resource information obtained, a part of the computer calculation resource currently used by the first program. A second program is executed, using the released computer calculation resource. An information processing system comprises a parallel execution condition information obtaining unit for obtaining parallel execution condition information indicating condition of one of the plurality of second programs, one to be executed in parallel to the first program, the condition being set according to the first program and, and an execution restricting unit for restricting execution of a part or all of the plurality of second programs, based on the parallel execution condition information.

6 Claims, 6 Drawing Sheets

(56) References Cited

U.S. PATENT DOCUMENTS

| | | | |
|---|---|---|---|
| 7,496,918 B1* | 2/2009 | Dice et al. | 718/100 |
| 7,694,107 B2* | 4/2010 | Lin et al. | 712/28 |
| 8,024,737 B2* | 9/2011 | Blanding et al. | 718/104 |
| 2005/0010608 A1* | 1/2005 | Horikawa | 707/200 |
| 2006/0085787 A1* | 4/2006 | Breslaw | G06F 9/485 |
| | | | 718/100 |
| 2006/0112179 A1* | 5/2006 | Baumeister | H04L 12/2805 |
| | | | 709/226 |
| 2007/0150895 A1* | 6/2007 | Kurland | 718/102 |

FOREIGN PATENT DOCUMENTS

| | | |
|---|---|---|
| JP | 08314681 | 11/1996 |
| JP | 11272382 | 10/1999 |
| JP | 2005-31975 | 2/2005 |

OTHER PUBLICATIONS

International Preliminary Report on Patentability dated Nov. 17, 2008, and an English-language translation, from corresponding PCT/JP07/053215.

Japanese Office Actions dated Sep. 24, 2010 and Jun. 24, 2011, from corresponding Japanese Application No. 2006-128744.

\* cited by examiner

INFORMATION PROCESSING SYSTEM AND COMPUTER CONTROL METHOD FOR CALCULATING AND ALLOCATING COMPUTER RESOURCES

TECHNICAL FIELD

The present invention relates to an information processing system and a computer control method, and more particularly to a computer environment in which a plurality of programs are executed in parallel.

BACKGROUND ART

There is known a technique for dividing calculation resources, such as a memory, a CPU time, and so forth, of a computer so that a plurality of programs are executed using the respective calculation resources. According to this technique, a general purpose program, such as a system setting program and so forth, is installed beforehand in a computer so that the program can be executed at any time, when execution thereof is required while an application program installed after the installation of the general purpose program is being executed. This arrangement improves user convenience, and as duplicated development of a general purpose program can be avoided, also improves development efficiency.

DISCLOSURE OF THE INVENTION

An information processing system according to the present invention is an information processing system including a first program, a plurality of second programs, and a computer for executing the programs, wherein the first program causes the computer to function as calculation resource information obtaining means for obtaining calculation resource information for determining computer calculation resource to be used by one of the plurality of second programs, one beginning to be executed by the computer, and calculation resource releasing means for releasing, based on the calculation resource information obtained, a part of the computer calculation resource currently used by the first program, and the plurality of second programs are executed using the computer calculation resource released.

Also, an information processing system according to the present invention comprises parallel execution condition information obtaining means for obtaining parallel execution condition information indicating condition of one/ones of the plurality of second programs, one/ones to be executed in parallel to the first program, the condition being set according to the first program and, and execution restricting means for restricting execution of a part or all of the plurality of second programs, based on the parallel execution condition information.

BEST MODE FOR CARRYING OUT THE INVENTION

In the following, one embodiment of the present invention will be described in detail with reference to the accompanying drawings.

Figure 1:
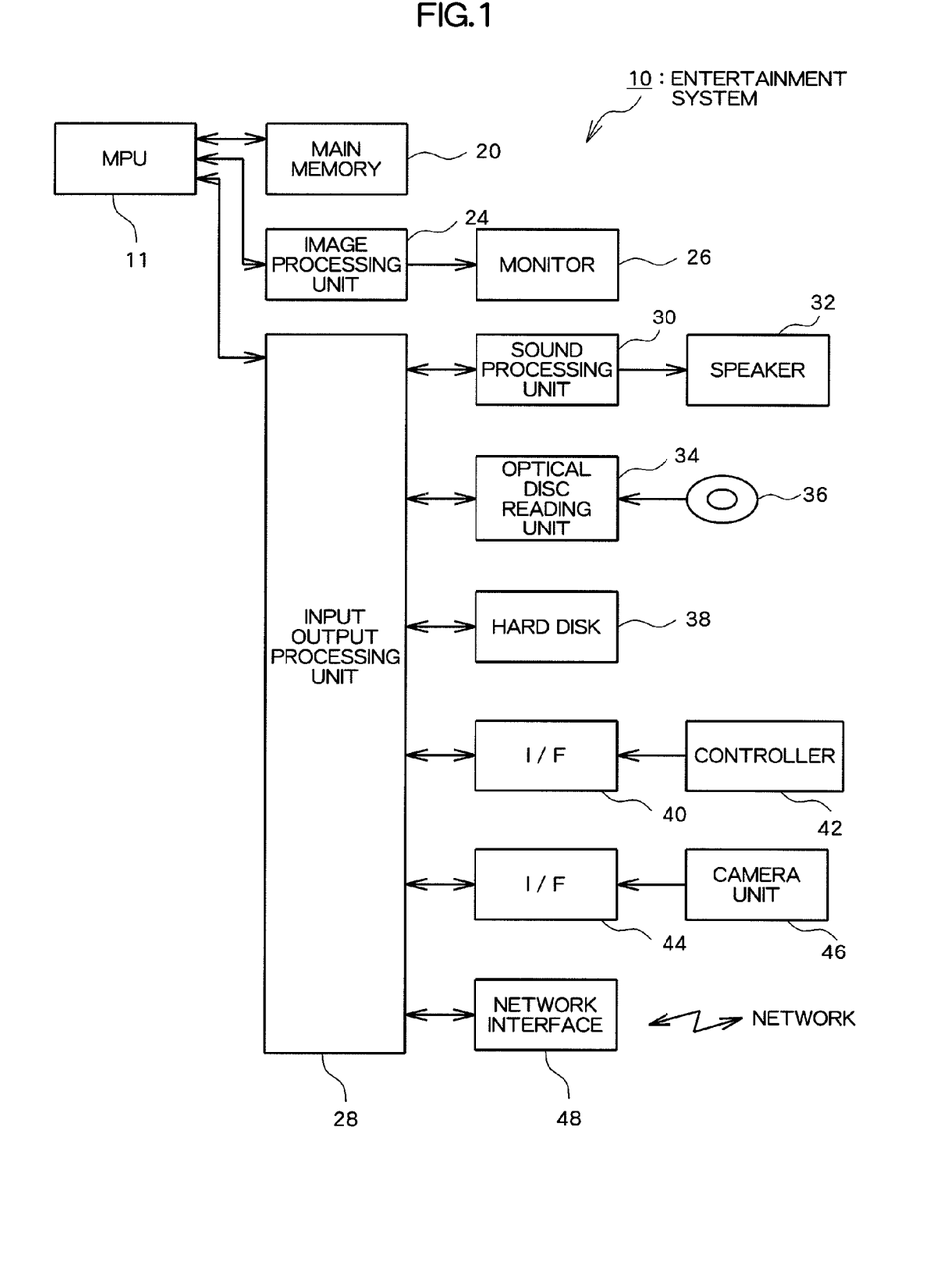
FIG. 1 is a diagram showing a hardware structure of an entertainment system according to an embodiment of the present invention.

FIG. 1 is a diagram showing a hardware structure of an entertainment system (an information processing system) according to this embodiment. As shown in the diagram, the entertainment system 10 is a computer system comprising an MPU (Micro Processing Unit) 11, a main memory 20, an image processing unit 24, a monitor 26, an input output processing unit 28, a sound processing unit 30, a speaker 32, an optical disc reading unit 34, an optical disc 36, a hard disk 38, interfaces (I/F) 40, 44, a controller 42, a camera unit 46, and a network interface 48.

Figure 2:
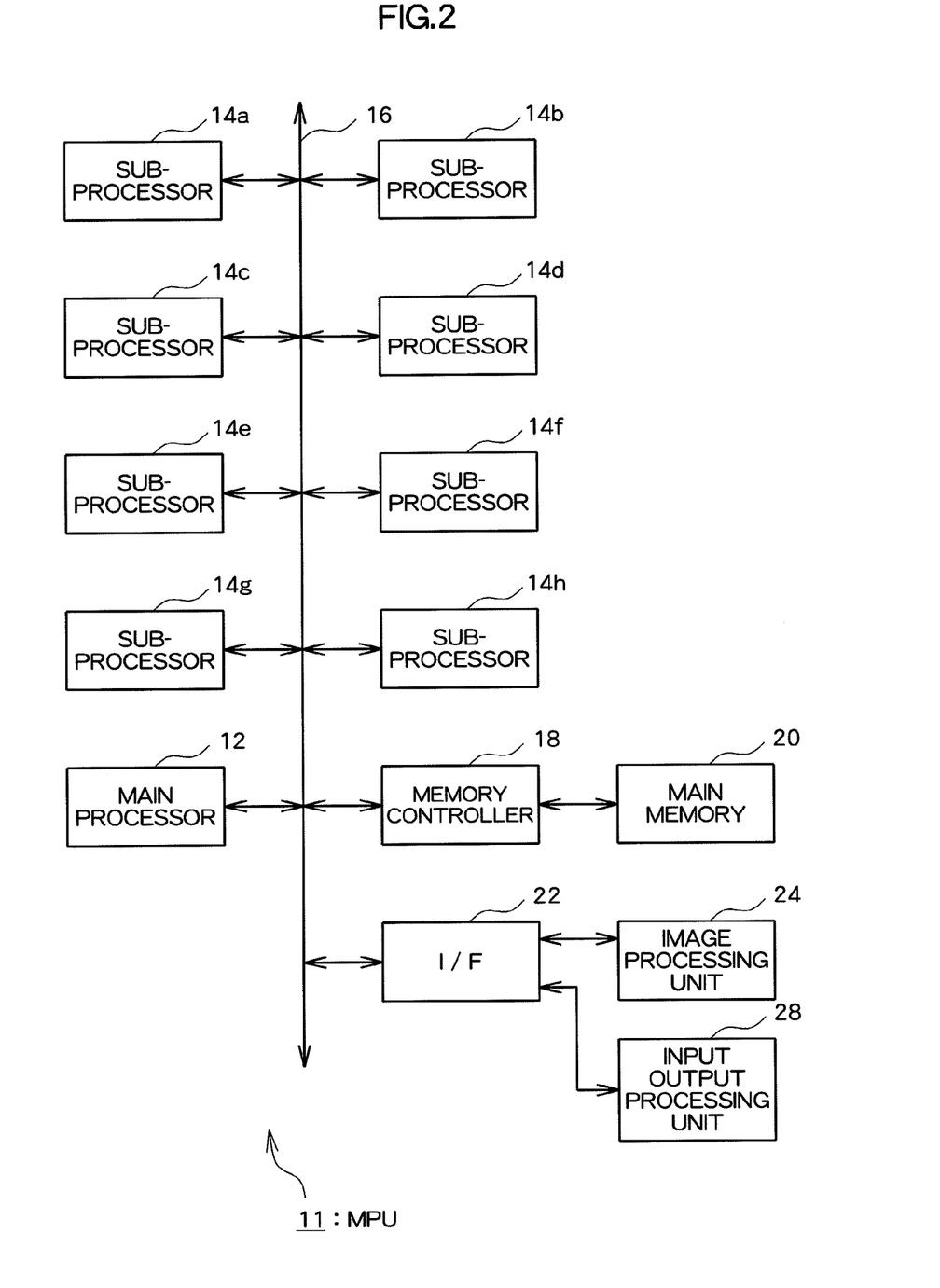
FIG. 2 is a diagram showing a structure of an MPU.

FIG. 2 is a diagram showing a structure of the MPU 11 (program executing means). As shown in the diagram, the MPU 11 comprises a main processor 12, sub-processors 14a, 14b, 14c, 14d, 14e, 14f, 14g, 14h, a bus 16, a memory controller 18, and an interface (I/F) 22.

The main processor 12 carries out various information processes and controls the sub-processors 14a to 14h, based on an operating system stored in a ROM (Read Only Memory) (not shown), a program and data read from the optical disc 36, such as, e.g., a DVD (Digital Versatile Disk)-ROM and so forth, and those supplied via a communication network and so forth.

The sub-processors 14a to 14h carry out various information processes according to an instruction from the main processor 12 and control the respective units of the entertainment system 10, based on a program and data read from the optical disc 36, such as, e.g., a DVD-ROM and so forth, and those supplied via a communication network and so forth.

The bus 16 is used for exchanging an address and data among the respective units of the entertainment system 10. The main processor 12, sub-processors 14a to 14h, memory controller 18, and interface 22 are mutually connected via the bus 16 for data exchange.

The memory controller 18 accesses the main memory 20 according to an instruction from the main processor 12 and sub-processors 14a to 14h. A program and data read from the optical disc 36 and/or hard disk 38 and those supplied via a communication network are written into the main memory 20 as required. The main memory 20 is used as a working memory of the main processor 12 and sub-processors 14a to 14h.

The image processing unit 24 and input output processing unit 28 are connected to the interface 22, via which data exchange between the main processor 12 and sub-processors 14a to 14h and the image processing unit 24 or input output processing unit 28 is carried out.

The image processing unit 24 comprises a GPU (Graphical Processing Unit) and a frame butter. The GPU renders various screen images into the frame buffer, based on the image data supplied from the main processor 12 and sub-processors 14a to 14h. A screen image formed in the frame buffer, that is, a screen image showing the result of execution by the MPU 11, is converted into a video signal at a predetermined time and output to the monitor 26. It should be noted that the monitor 26 may be, e.g., a home-use television set receiver.

The input output processing unit 28 is connected to the sound processing unit 30, optical disc reading unit 34, hard disk 38, and interfaces 40, 44. The input output processing unit 28 controls data exchange between the main processor 12 and sub-processors 14a to 14h and the sound processing unit 30, optical disc reading unit 34, hard disk 38, interfaces 40, 44, and network interface 48.

The sound processing unit 30 comprises an SPU (Sound Processing Unit) and a sound buffer. The sound buffer stores various kinds of sound data, such as game music, game sound effects, a message, and so forth, read from the optical disc 36 and/or hard disk 38. The SPU reproduces the various kinds of sound data, and outputs via the speaker 32. It should be noted that the speaker 32 may be, e.g., a built-in speaker of a home-use television set receiver.

The optical disc reading unit 34 reads a program and data recorded in the optical disc 36 according to an instruction from the main processor 12 and/or sub-processors 14a to 14h. It should be noted that the entertainment system 10 may be formed capable of reading a program and data stored in a computer readable information storage medium other than the optical disc 36.

The optical disc 36 is a general optical disc (e.g., a computer readable information storage medium), such as, e.g., a DVD-ROM or the like. The hard disk 38 is a general hard disk device. Various programs and data are recorded in the optical disc 36 and/or hard disk 38 in a computer readable manner.

The interfaces (I/F) 40, 44 are used to connect various peripheral devices, such as the controller 42, camera unit 46, and so forth. Such an interface may be, e.g., a USB (Universal Serial Bus) interface.

The controller 42 serves as a general purpose operation input means and is used by a user to input various operations (e.g., a game operation). The input output processing unit 28 scans the states of the respective units of the controller 42 every predetermined period of time (e.g., $\frac{1}{60}^{th}$ of a second), and supplies an operational signal describing the scanning result to the main processor 12 and sub-processors 14a to 14h. The main processor 12 and sub-processors 14a to 14h determine the content of an operation carried out by the user, based on the operational signal. It should be noted that the entertainment system 10 is formed adapted to connection to a plurality of controllers 42 so that the main processor 12 and sub-processors 14a to 14h can carry out various processes, based on the operation signals input from the respective controllers 42.

The camera unit 46 comprises, e.g., a publicly known digital camera, and inputs a captured black/white, grey-scaled, or colored image every predetermined period of time (e.g., $\frac{1}{60}^{th}$ of a second). The camera unit 46 in this embodiment inputs a captured image as image data in the JPEG (Joint Photographic Experts Group) format. The camera unit 46 is mounted on the monitor 26, having the lens thereof, e.g., directed to the player, and connected via a cable to the interface 44. The network interface 48 is connected to the input output processing unit 28 and a communication network such as the Internet or the like to relay data communication made by the entertainment system 10 via the network to another entertainment system 10 or the like.

Figure 3:
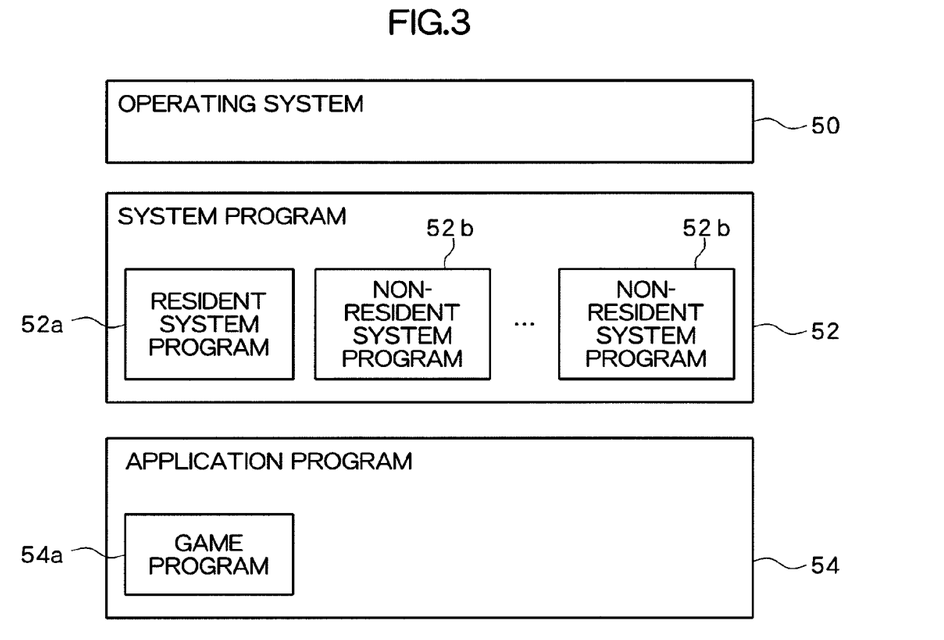
FIG. 3 is a diagram showing a program installed in the entertainment system.

As shown in FIG. 3, the entertainment system 10 has an operating system 50, a system program 52, and an application program 54 installed therein. The operating system 50 is stored in a ROM (not shown) or the hard disk 38 and includes a boot program and a program for various basic functions of the entertainment system 10.

The system program 52 is stored in the ROM (not shown) or hard disk 38, and includes a program for various general functions often used by a user. Specifically, as shown in FIG. 3, the system program 52 includes a resident system program 52a and a plurality of non-resident system programs 52b, in which the former resides in the main memory 20 when the entertainment system 10 is activated, and the latter is activated in response to a user's instruction or an instruction from another program. The resident system program 52a has, e.g., a function for displaying a menu to be referred to by a user instructing to activate a non-resident system program 52b, a function for displaying various messages, and a function for making various settings on the entertainment system 10. The non-resident system program 52b is a program for sorting out the content stored in the hard disk 38 and/or a portable storage medium (not shown), a program for a software keyboard, a program for a Web browser, a program for chatting with another user via a communication network, and so forth.

The application program 54 is stored in the optical disc 36 and/or hard disk 38, and loaded into the main memory 20. The application program 54 is a program for a specific purpose, specifically, a game program 54a here.

In the entertainment system 10, the above described programs are executed in parallel, using the calculation resources, such as the main processor 12, sub-processor 14a to 14h, main memory 20, and so forth. That is, the resident system program 52a, one or more non-resident system programs 52b, and the game program 54a are concurrently executed on the operating system 50.

Figure 4:
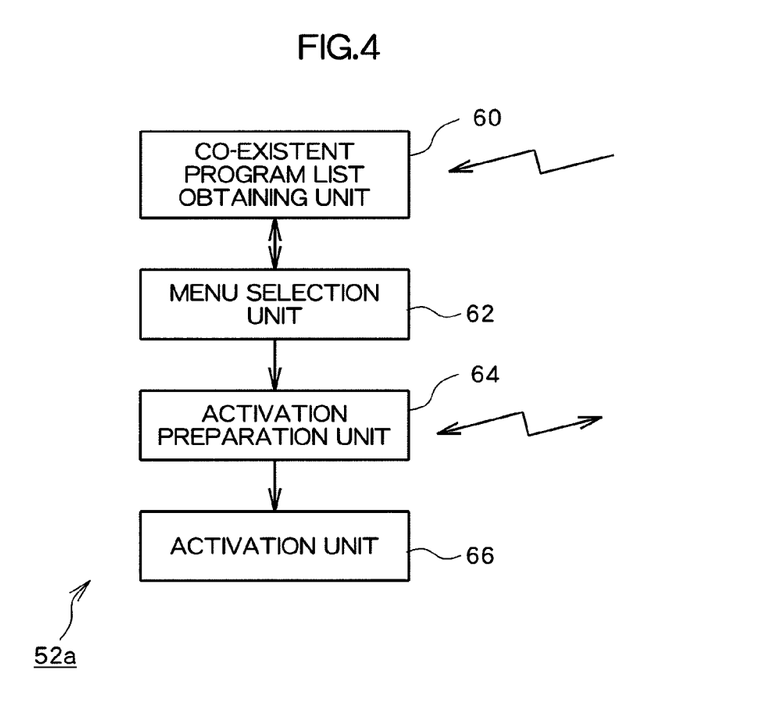
FIG. 4 is a functional block diagram of a resident system program.

As shown in FIG. 4, the resident system program 52a causes the entertainment system 10 to function as a co-existent program list obtaining unit 60, a menu selection unit 62, an activation preparation unit 64, and an activation unit 66.

The co-existent program list obtaining unit 60 obtains a co-existent program list (parallel execution condition information) set by the game program 54a. The co-existent program list shows a condition to be satisfied by a non-resident system program 52b permitted to be executed in parallel with the game program 54a among a plurality of non-resident system programs 52b, including information stating whether or not each non-resident system program 52b is permitted to be executed in parallel with the game program 54a.

The menu selection unit 62 displays a menu screen image on the monitor 26, and according to an operation signal input from the controller 42, selects one of the icon images related to the respective non-resident system programs 52b, shown on the menu screen. In displaying the menu screen image, the menu selection unit 62 obtains the latest co-existing program list having been obtained by the co-existent program list obtaining unit 60, and displays on the monitor 26 only an icon image related to a non-resident system program 52b permitted to be executed in parallel with the game program 54a which is currently executed, but not an icon image related to an otherwise non-resident system program 52b. With this arrangement, instruction to execute a non-resident system program 52b not permitted, according to the co-existent program list, to be executed in parallel with the game program 54a is restricted.

The activation preparation unit 64 prepares for activation of the non-resident system program 52b selected by the menu selection unit 62. Specifically, an activation request which includes calculation resource information about calculation resources (e.g., a memory usage amount of the main memory 20 and so forth and processor usage amounts of the main processor 12 and sub-processors 14a to 14h and so forth) necessary in execution of the selected non-resident system program 52b is notified to the game program 54a. The calculation resource information is identification of, e.g., a non-resident system program 52b, and in this case, calculation resources necessary in execution of the non-resident system program 52b identified by the identification are determined based on the identification on the game program 54a side. Alternatively, the calculation resource information may be information identifying the calculation resources themselves necessary in execution of the selected non-resident system program 52b.

The game program 54a releases the calculation resources necessary in execution of the non-resident system program 52b selected by the menu selection unit 62, according to the calculation resource information notified by the activation preparation unit 64, and after the calculation resources are released, the activation unit 66 activates the selected non-resident system program 52b. In the above, the game program 54a provides the resident system program 52a with display position data indicating a position at which to display the image of a window or the like where the result of execution of the non-resident system program 52b is displayed. Specifically, the display position data is provided when the selected non-resident system program 52b is activated.

The non-resident system program 54b is a program to be executed using the calculation resources released by the game program 54a. With the above-described display position data obtained, an image describing the result of execution is displayed in an according position.

Figure 5:
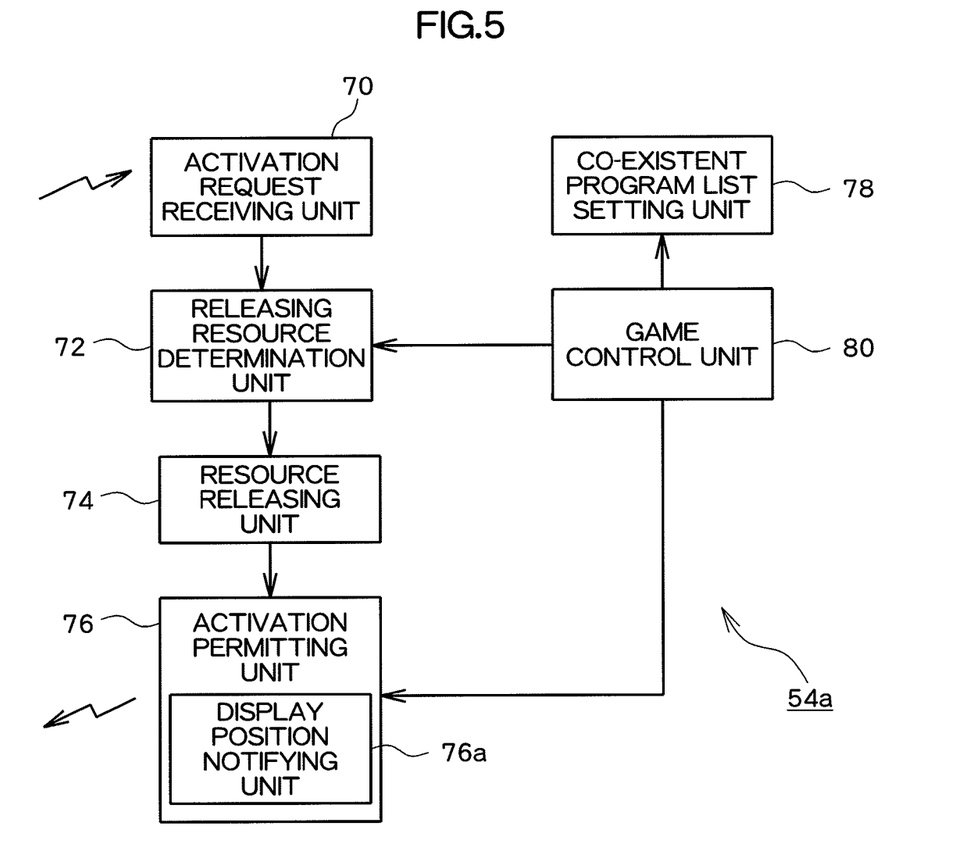
FIG. 5 is a functional block diagram of a game program.

As shown in FIG. 5, the game program 54a causes the entertainment system 10 to function as an activation request receiving unit 70, a releasing resource determination unit 72, a resource releasing unit 74, an activation permitting unit 76, a co-existent program list setting unit 78, and a game control unit 80.

Figure 6:
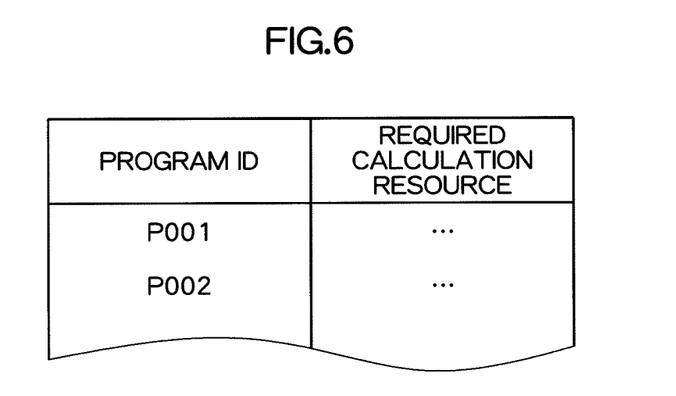
FIG. 6 is a diagram showing one example of a table showing calculation resource required by each non-resident system program.

The activation request receiving unit 70 receives the activation request from the resident system program 52b, and provides the calculation resource information (identification of a non-resident system program 52b) contained therein to the releasing resource determination unit 72. The releasing resource determination unit 72 stores identification (a program ID) of a non-resident system program 52b and calculation resources necessary in execution of the non-resident system program 52b so as to be associated with each other, as shown in, e.g., FIG. 6, and reads therefrom the calculation resources corresponding to the calculation resource information provided by the activation request receiving unit 70. Further, the releasing resource determination unit 72 obtains the calculation resources being used by the game program 54a from the game control unit 80, and determines the calculation resources to be released by the program 54a, based on both of the calculation resource corresponding to the calculation resource information and the calculation resources being used by the game program 54a. The resource releasing unit 74 instructs the operating system 50 to release the determined amount of calculation resources.

Figure 7:
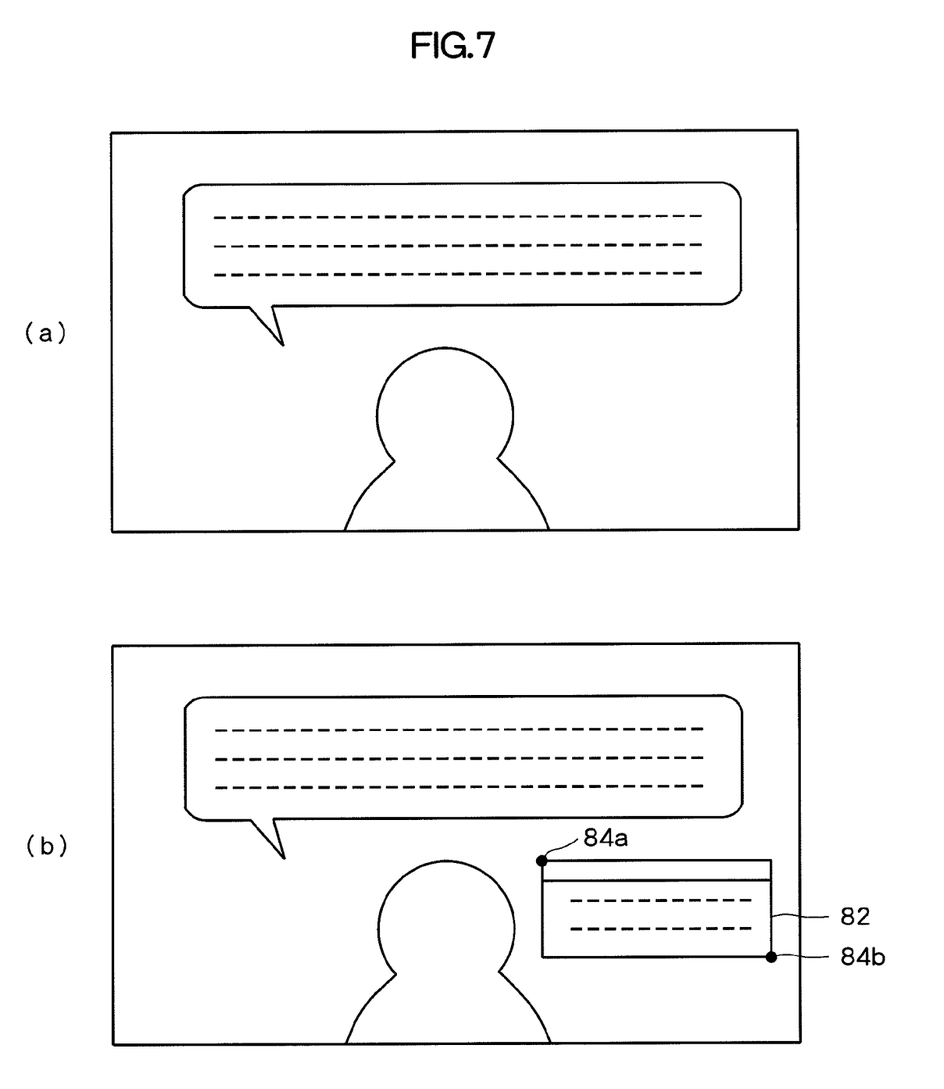
FIG. 7 is a diagram showing one example of screen images shown on a monitor before and after activation of a non-resident system program.

After releasing of the calculation resources by the resource releasing unit 74, the activation permitting unit 76 notifies the resident system program 52a that activation of the selected non-resident system program 52b is to be permitted. The activation permitting unit 76, which has a display position notifying unit 76a, obtains display position data describing a position on the display screen, at which to display the result of execution of the non-resident system program 52b, from the game control unit 80, and includes the display position data in the notice. With the above, it is possible to determine, on the game program 54a side, a position on the display screen at which to display the result of execution of the non-resident system program 52b, depending on the content currently displayed on the monitor 26 according to the game program 54a, and to instruct the position, so that a state in which an important part of the result of execution of the game program 54a is covered, and thus hidden, by the displayed result of execution of the non-resident system program 52b is not caused. FIG. 7(a) shows one example of content displayed on the monitor 26 before execution of the non-resident system program 52b; FIG. 7(b) shows one example of content displayed on the monitor 26 after execution of the non-resident system program 52b. The display position notifying unit 76a notifies the resident system program 52a of data specifying an area at which to display the image 82 showing the result of execution of the non-resident system program 52b, the area determined depending on the content of the game screen image (FIG. 7(a)) produced by the game control unit 80, that is, data specifying the positions 84a, 84b, or corners, of the area.

The game control unit 80 executes various game programs to display a game screen image on the monitor 26 and to output game music and sound effect via the speaker 32. The co-existent program list setting unit 78 sets a co-existent program list to be referred to by the menu selection unit 62 when, e.g., displaying a menu. The co-existent program list may be set when activating the game program 54a or re-set every update of the layout of the game screen image by the game control unit 80.

Figure 8:
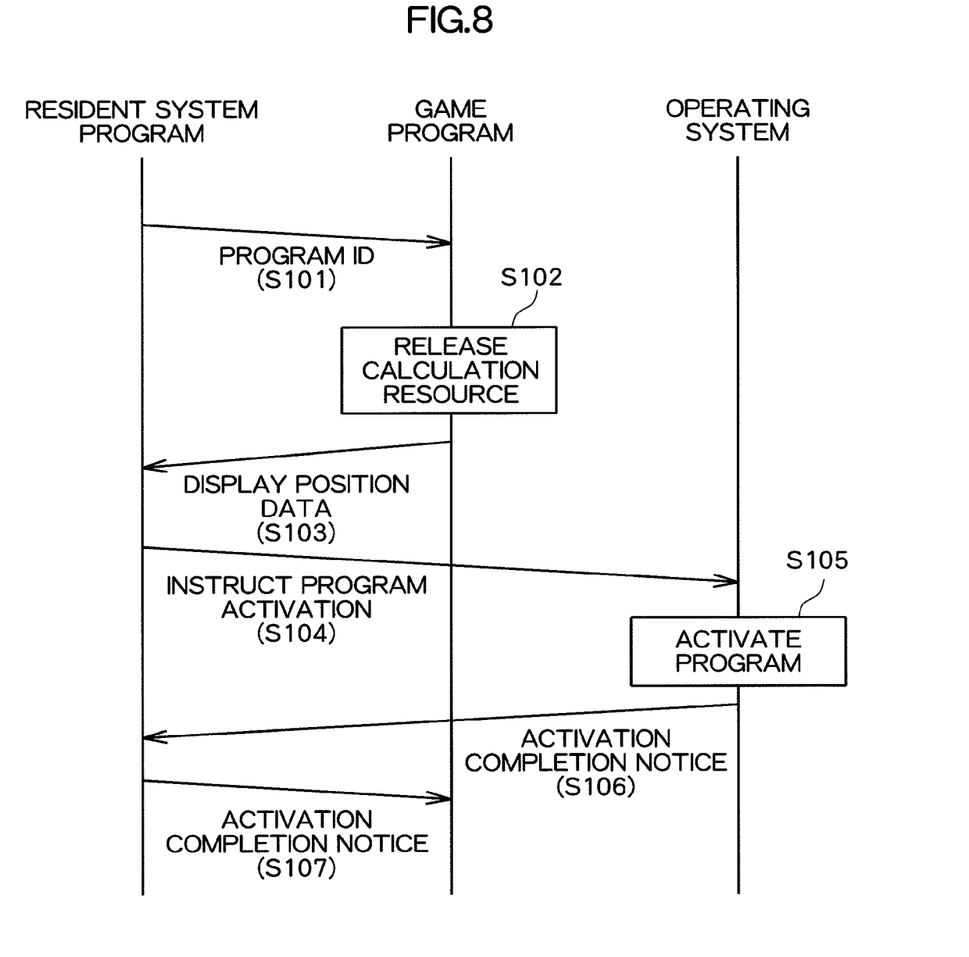
FIG. 8 is a sequential diagram showing an operation of the entertainment system according to the embodiment of the present invention.

FIG. 8 is a sequential diagram of an operation to be carried out when activating a non-resident system program 52b while the game program 54a is being executed in the entertainment system 10. As shown in the diagram, with one non-resident system program 52b selected by the menu selection unit 62 of the resident system program 52a, the program ID thereof is notified to the game program 54a (S101). On the game program 54a side, calculation resources to be released are determined based on the program ID, and then released (S102). Thereafter, an activation permission which contains the display position data is sent to the resident system program 52a (S103).

On the resident system program 52a side, upon receipt of the activation permission, the operating system 50 is instructed to activate the non-resident system program 52b selected by the user (S104). In the above, the display position data notified by the game program 54a is provided as an argument. Thereupon, the operating system 50 activates the selected non-resident system program 52b (S105), and notifies the resident system program 52a of completion of the activation (S106). On the resident system program 52a side, upon receipt of the notice, completion of the activation of the non-resident system program 52b is notified to the game program 54a (S107).

According to the above described embodiment, the game program 54a sets a co-existent program list, and a menu to be referred to when activating a non-existent system program 52b is changed according to the co-existent program list so that the user can no longer instruct activation of a non-resident system program 52*b* not desired to be executed in parallel with the game program 54*a*. With the above, execution of such a non-resident system program 52*b* is restricted, so that stable operation of the game program 54*a* can be ensured.

In addition, when a non-resident system program 52*b* is activated while the game program 54*a* is being executed, sufficient calculation resources can become available for use with the non-resident system program 52*b* as the game program 54*a* can release a required amount of calculation resources. This makes it possible to ensure efficient use of calculation resources of the entertainment system 10.

Also, it is possible to restrict activation of a non-resident system program 52*b* not desired to be executed in parallel with the game program 54*a* being executed. Further, when displaying the result of execution of a non-resident system program 52*b* while the result of execution of the game program 54*a* is being displayed, an appropriate position to display the former can be ensured.

It should be noted that the present invention is not limited to the above described embodiment. For example, to activate the game program 54*a* while a non-resident system program 52*b* is being executed, e.g., the resident system program 52*a* may obtain the co-existent program list in the data about the game program 54*a* (e.g., a file stored in the optical disc 36) before the activation, and whether or not any non-resident system program 52*b* not permitted to be executed in parallel with the game program 54*a* is being executed may be determined with reference to the co-existent program list. When it is determined that such a non-resident system program 52*b* is being executed, the resident system program 52*a* suspends the ongoing non-resident system program 52*b* before activating the game program 54*a*. In the above, preferably, identification of the ongoing (that is, not suspended) non-resident system program 52*b* may be notified to the game program 54*a*.

It should be noted that to suspend the ongoing non-resident system program 52*b*, the user is encouraged to input information stating their intention to do so, so that the program is accordingly suspended. In the above, when the user does not wish to suspend execution of a non-resident system program 52*b* not permitted to be executed in parallel with the game program 54*a* according to the co-existent program list, activation of the game program 54*a* is called off.

As described above, it is possible to suspend any ongoing non-resident system program 52*b* not desired to be executed in parallel with the game program 54*a* when the game program 54*a* is activated. This can ensure stable operation of the game program 54*a*.

It should be noted that when it is determined, with reference to the co-existent program list, that parallel execution of the ongoing non-resident system program 52*b* and a game program 54*a* related to the co-existent program list is not permitted, activation of the game program 54*a* may be restricted (prohibited). In this case, use of the user interface by the user to activate the game program 54*a*, that is, e.g., display of an icon image for use in instructing activation of the game program 54*a*, may be restricted, whereby making an instruction, using the user interface, to activate the game program 54*a* is restricted. Alternatively, when it is determined, after receipt of a user's instruction to activate a game program 54*a*, that the activation is not permitted according to the co-existent program list related to the game program 54*a*, a message stating to that effect may be output to call off the activation.

The invention claimed is:

1. An information processing system comprising:
a computer which executes an application program and a non-resident system program, wherein the application program executed on the computer causes the computer to:
receiving a selection from a user to execute the non-resident system program from a listing of a plurality of non-resident system programs;
obtain calculation resource information for determining computer calculation resources to be used by the selected non-resident system program;
release, based on the obtained calculation resource information, a part of the computer calculation resources currently used for execution and processing of the application program, and
initiate and execute the non-resident system program only using the released computer calculation resources.

2. The information processing system according to claim 1, wherein
the computer further executes a third program, and
the third program causes the computer to function as
program selecting means for selecting the non-resident system program,
calculation resource information notifying means for notifying the application program of the calculation resource information related to the non-resident system program selected, and
program execution beginning means for beginning execution of the non-resident system program selected using the computer calculation resources released by the application program.

3. The information processing system according to claim 1, wherein
the calculation resource information is information identifying the non-resident system program executed by the computer, and
the application program includes information about the computer calculation resources to be released by the application program when execution of the non-resident system program identified by the information is begun, so as to be associated with the information identifying the non-resident system program.

4. The information processing system according to claim 2, wherein the calculation resource information is information indicating the computer calculation resources to be used by the non-resident system program selected.

5. A control method for a computer executing an application program, the method comprising:
receiving a selection from a user to execute the non-resident system program from a listing of plurality of non-resident system programs;
obtaining calculation resource information for determining computer calculation resources to be used by the selected non-resident system;
releasing, based on the calculation resource information, a part of the computer calculation resources currently used for execution and processing of the application program; and
initiating and executing the non-resident system program only using the released computer calculation resources.

6. A non-transitory information storage medium storing a program for causing a computer to function as:
program selecting means for selecting a non-resident system program by a user from a listing of a plurality of non-resident system programs;

calculation resource information notifying means for notifying an application program of calculation resource information for determining computer calculation resources to be used by the selected non-resident system program that are currently used for execution and processing of the application program; and program execution beginning means for initiating and executing the non-resident system program only using computer calculation resources released by the application program based on the calculation resource information.

\* \* \* \* \*